US009678959B2

United States Patent
Urban et al.

(10) Patent No.: US 9,678,959 B2
(45) Date of Patent: Jun. 13, 2017

(54) METHOD OF SELECTING VERSIONS OF A DOCUMENT FROM A PLURALITY OF VERSIONS RECEIVED AFTER A SEARCH, AND RELATED RECEIVER

(75) Inventors: Fabrice Urban, Thorigne Fouillard (FR); Olivier Le Meur, Talensac (FR); Christel Chamaret, Chantepie (FR); Alexandre Ninassi, Saint Martin de Fontenay (FR); Jean-Claude Chevet, Betton (FR)

(73) Assignee: Thomson Licensing (FR)

( * ) Notice: Subject to any disclaimer, the term of this patent is extended or adjusted under 35 U.S.C. 154(b) by 128 days.

(21) Appl. No.: 13/378,726

(22) PCT Filed: Jun. 15, 2010

(86) PCT No.: PCT/EP2010/058416
§ 371 (c)(1),
(2), (4) Date: Feb. 29, 2012

(87) PCT Pub. No.: WO2010/146066
PCT Pub. Date: Dec. 23, 2010

(65) Prior Publication Data
US 2012/0150849 A1    Jun. 14, 2012

(30) Foreign Application Priority Data

Jun. 19, 2009    (FR) .................................... 09 54142

(51) Int. Cl.
*G06F 17/30*    (2006.01)
*H04N 21/2343*    (2011.01)

(52) U.S. Cl.
CPC .... *G06F 17/3002* (2013.01); *G06F 17/30799* (2013.01); *G06F 17/30864* (2013.01); *H04N 21/23439* (2013.01)

(58) Field of Classification Search
CPC ......... G06F 17/30799; G06F 17/30802; G06F 17/30805; G06F 17/30808;
(Continued)

(56) References Cited

U.S. PATENT DOCUMENTS 5,983,218 A * 11/1999 Syeda-Mahmood ......... 707/769
6,003,030 A    12/1999 Kenner
(Continued)

FOREIGN PATENT DOCUMENTS

CA    2582531    4/2006
FR    2855005    11/2004
(Continued)

OTHER PUBLICATIONS

Evangelopoulos et al., (Evangelopoulos, Georgios, Konstantinos Rapantzikos, Alexandros Potamianos, Petros Maragos, A. Zlatintsi, and Yair Avrithis. "Movie summarization based on audiovisual saliency detection." In Image Processing, 2008. ICIP 2008. 15th IEEE International Conference on, pp. 2528-2531. IEEE, 2008.).*
(Continued)

*Primary Examiner* — Jason Liao
*Assistant Examiner* — Jesse P Frumkin
(74) *Attorney, Agent, or Firm* — Jack Schwartz & Associates, PLLC

(57) ABSTRACT

The present invention pertains to a method for selecting a version of a document. The user inputs an identifier of a document at the level of his receiver connected to at least one communication network, and initiates a search request to receive versions of at least one part of this document. The receiver then receives a plurality of versions of the said document. Each version received is analysed by a plurality of evaluation modules so as to calculate an evaluation value for each version received according to a predetermined criterion. The receiver selects for each of the evaluation
(Continued)

modules a version of the document having the best evaluation in respect of this criterion, and displays the identifiers of versions having the best evaluations according to each criterion. The user can then easily select the version for reproduction thereof which best meets a criterion. The invention also relates to a receiver implementing the said method.

12 Claims, 4 Drawing Sheets

(58) Field of Classification Search
CPC ......... G06F 17/30811; G06F 17/30814; G06F 17/30837; G06F 17/3084; G06F 17/30843; H04N 21/23439
USPC ......................................................... 707/203
See application file for complete search history.

(56) References Cited

U.S. PATENT DOCUMENTS

| | | | |
|---|---|---|---|
| 6,594,825 B1* | 7/2003 | Goldschmidt et al. | 725/53 |
| 6,754,445 B2 | 6/2004 | Nakata | |
| 7,167,580 B2* | 1/2007 | Klein et al. | 382/112 |
| 7,451,140 B2* | 11/2008 | Purvis et al. | |
| 7,840,977 B2* | 11/2010 | Walker et al. | 725/38 |
| 7,860,317 B2* | 12/2010 | Xie et al. | 382/195 |
| 8,130,274 B2* | 3/2012 | Okamoto | H04N 17/00 348/180 |
| 8,316,997 B2* | 11/2012 | Mitsuda et al. | 187/384 |
| 8,589,784 B1* | 11/2013 | Verstak et al. | 715/229 |
| 2002/0099695 A1 | 7/2002 | Abajian | |
| 2004/0070597 A1* | 4/2004 | Van Epps | 345/732 |
| 2005/0216443 A1* | 9/2005 | Morton | G06F 17/3002 |
| 2007/0061384 A1* | 3/2007 | Harrington et al. | 707/203 |
| 2007/0237426 A1* | 10/2007 | Xie et al. | 382/305 |
| 2007/0266001 A1 | 11/2007 | Williams et al. | |
| 2008/0141317 A1* | 6/2008 | Radloff et al. | 725/87 |
| 2008/0172699 A1* | 7/2008 | Sahasrabudhe | 725/56 |
| 2008/0201348 A1 | 8/2008 | Edmonds et al. | |
| 2008/0298470 A1 | 12/2008 | Boyce et al. | |
| 2009/0063561 A1* | 3/2009 | Sayko et al. | 707/104.1 |
| 2009/0067511 A1 | 3/2009 | Wei et al. | |
| 2009/0083245 A1* | 3/2009 | Ayotte et al. | 707/4 |
| 2010/0189351 A1* | 7/2010 | Mattausch et al. | 382/173 |
| 2013/0028511 A1* | 1/2013 | Chamaret et al. | 382/165 |
| 2013/0315505 A1* | 11/2013 | Atkins et al. | 382/300 |

FOREIGN PATENT DOCUMENTS

| | | |
|---|---|---|
| FR | 2855005 A1 * | 11/2004 |
| JP | 2003319420 | 11/2003 |
| JP | 200743562 | 2/2007 |
| JP | 2009117963 | 9/2008 |
| WO | WO 2009/003124 | 12/2008 |
| WO | WO 2009003124 | 12/2008 |

OTHER PUBLICATIONS

Ardizzone, Edoardo, and Alessandro Bruno. "Image quality assessment by saliency maps." In VISAPP 2012. 2012.*
Boujut, Hugo, Jenny Benois-Pineau, Ofer Hadar, Toufik Ahmed, and Patrick Bonnet. "Weighted-MSE based on Saliency map for assessing video quality of H. 264 video streams." In IS&T/SPIE Electronic Imaging, pp. 78670X-78670X. International Society for Optics and Photonics, 2011.*
Le Meura, O., and P. Le Calletb D. Barbab. "Selective H. 264 Video Coding Based on a Saliency Map."*
Voran, S. D., and Stephen Wolf. "The development and evaluation of an objective video quality assessment system that emulates human viewing panels." In Broadcasting Convention, 1992. IBC., International, pp. 504-508. IET, 1992.*
Ma, Qi, Liming Zhang, and Bin Wang. "New strategy for image and video quality assessment." Journal of Electronic Imaging 19, No. 1 (2010): 011019-011019.*
Search Rept: Jul. 22, 2010.
Chang et al., "Next-Generation Content Representation, Creation, and Searching for New Media Applications in Education", Proceedings of the IEEE, vol. 86, No. 5, May 1998, p. 884-904, New York, USA.
http://web.archive.org/web/20080915204009/http://developer.truveo.com/UsingFilters.php.
http://web.archive.org/web/20081024072704/http://www.happyvest.com.
Kato et al., "A Video Classification Method Using User Preceptive Video Quality", p. 203-208.
Liu et al., "Multimedia Content Acquisition and Processing in the Miracle System",IEEE CCNC Proceedings, 2006, p. 272-276.
Liu et al., "Video Classification for video quality prediction", Journal of Zhejiang University Science A, Mar. 3, 2006, 7 (5), p. 919-926, China.
Marziliano et al., "A No Reference Perceptual Blur Metric",IEEE ICIP 2002, p. 57-60, Lausanne, Switzerland.
Ninassi et al., "On the Performance of Human Visual System Based Image Quality Assessment Metric Using Wavelet Domain", Thomson Corporate Research, p. 1-12, Nantes, France.
Petrelli et al., "An examination of automatic video retrieval technology on access to the contents of an historical video archive", Electronic library and information;Sheffield University Research Archive, 42(2), p. 115-136;UK 2008.
Sav et al., "An automatic technique for visual quality classification for MPEG-1 video", p. 1-5, Centre for Digital Video Processing, Dublin City University, Dublin, Ireland.
Tong et al., "Blur Detection for Digital Images Using Wavelet Transform", p. 1-4, China.
Wang et al., "Image Quality Assessment: From Error Visibility to Structural Similarity", IEEE Transactions on Image Processing, Apr. 2004, p. 1-14, vol. 13, No. 4, USA.
Wu et al., "A Generalized Block-Edge Impairment Metric for Video Coding", IEEE Signal Processing Letters, Nov. 11, 1997, p. 317-320, vol. 4, No. 11.

* cited by examiner

METHOD OF SELECTING VERSIONS OF A DOCUMENT FROM A PLURALITY OF VERSIONS RECEIVED AFTER A SEARCH, AND RELATED RECEIVER

This application claims the benefit, under 35 U.S.C. §365 of International Application PCT/EP2010/058416, filed Jun. 15, 2010, which was published in accordance with PCT Article 21(2) on Dec. 23, 2010 in English and which claims the benefit of French patent application No. 0954142, filed Jun. 19, 2009.

The present invention relates to a method of selecting a version of an audiovisual document from among a plurality of versions received following a search, and to an apparatus able to implement the method.

Nowadays, numerous different means exist for receiving an audio and/or visual content. The simplest consists in connecting a receiving apparatus to a network and requesting a search for the desired document. Search engines integrated into the network make it possible to receive a document identifier, and to initiate requests to a large number of terminals possessing storage capacity. The request contains the name of the document identifier, the terminal analyses its memory so as to search it for the document in question.

If it is not there the terminal responds to the request through a simple negative response. If on the other hand, the document is accessible in the terminal, the latter responds by indicating that it can transmit the said document. The terminal requesting the document receives a first message indicating that it is possible to download the document. The user does or does not confirm this choice.

Certain terminals dispatch additional information about the document, such as the space that it occupies in memory or the coding software used. As a function of this information, the user can determine whether he still wishes to download this document or his terminal is not adapted for receiving and reproducing this document. If the response is negative, the user can initiate a second search by adding a new element so as to better identify the document in his request.

Customarily, the search procedure is interrupted when the network has found the first occurrence of the document. Other search engines transmit the search requests until the requesting terminal ceases requesting documents. The terminal of the requester then presents on the screen a menu with the information about the various documents identified. The user can choose the document, connects to the site offering it and downloads it from the said site.

The user cannot know beforehand what his search will provide him with. It is possible that a large number of documents may correspond to his search and be displayed on the screen of his terminal. The complementary information makes it possible to help the user to choose. Sometimes, the server side search engine proposes a ranking according to the relevance of the complementary information associated with the various documents. The user can therefore either read the complementary information of each document, or simply choose the first choice proposed to him by the search engine.

However, the choices are indicated by the search engine and are not necessarily in accordance with what is expected by the user.

Document WO 2009/003124 filed by SEEQPOD describes a computer capable of dispatching a search request on the network and of recording documents. The request is based on key words and makes it possible to tag documents, these documents can therefore be similar. The receiver evaluates the documents downloaded as a function of the associated key words and selects the documents which best correspond to the criteria. The various documents are displayed in the form of a "play list". This document teaches the sending of a request to receive a single version of the requested document. If the version received is not of good quality, it is necessary to initiate a new request at the risk of receiving the same content and therefore of disgruntling the user.

The present invention makes it possible to present several different versions of one and the same document to the user so as to allow him to choose the version which best corresponds to his quality criteria.

The invention relates to a method of selecting a version from among a plurality of versions of a document comprising a step of inputting an identifier of the said document at the level of a receiver connected to at least one communication network, and a step of initiating a search to receive the plurality of versions of the document identified in the receiver; characterized in that it comprises:

a prior step of receiving a plurality of at least partial versions of the said document within the receiver, a subsequent step of analysing each version received by a plurality of evaluation modules present in the receiver, each module calculating an evaluation value for the version received according to a determined criterion, a step of selecting for each of the evaluation modules the identifiers of the versions having the best evaluation values according to each criterion and of displaying the said version identifiers, a step of inputting a command for selecting one of the identifiers displayed and of reproducing the version associated with this identifier.

In this way, the user rapidly perceives the version of the desired document which best corresponds to certain criteria evaluated by his receiver and can easily and rapidly select this version.

According to one refinement, the receiver waits for a certain duration for the results of the search. In this way, it is possible to receive document versions originating from slower networks, or originating from broadcasting networks. According to another refinement, the analysis step begins only at the end of the timeout, no version received subsequently is taken into account. In this way, the analysis steps may be initiated just once at the end of the timeout.

According to another refinement, the scheme comprises a step of calculating the sum of evaluation values computed by each module and a step of selecting a single version, the selected single version being the one whose sum of evaluation values is the biggest. In this way, the receiver can propose to the user a version which best meets all the criteria that his receiver can evaluate. According to another refinement, during the calculation of the sum of the evaluation values, certain evaluation values at least are multiplied with values defined by the user so as to assign more or less importance to certain criteria. In this way, the version which best meets all the criteria can depend on preferences of the user.

According to another refinement, the version received is split into a plurality of time intervals of the same duration in the course of which a fragmentary evaluation score is calculated. The evaluation score for the version received is the average of the fragmentary scores. In this way, the evaluation is performed over the whole of the duration of the version received and in an equitable manner.

According to another refinement, the fragmentary evaluation score acquires more importance for the calculation of the overall evaluation score if the associated time interval corresponds to an important moment of the document. In this way, the evaluation takes into account the importance of certain moments.

According to another refinement, the version of the document originates from a broadcasting network. The parameters which make it possible to receive the version are received beforehand from the communication network in response to the search. In this way, the user can also receive versions which originate from a network other than that which allowed the search to be initiated.

The present invention also relates to an apparatus for viewing a plurality of versions of a document comprising a means for inputting an identifier of a document and a means for sending a search request to at least one communication network to receive the plurality of versions of the identified document; characterized in that it comprises:

a means for receiving a plurality of at least partial versions of the said identified document, the said receiving means being activated subsequently to the sending of the search request, a plurality of evaluation modules each making it possible to calculate an evaluation value for each version received according to a determined criterion, a means for displaying the identifiers of the versions having the best evaluation values according to each criterion, the means for inputting a command making it possible to select one of the versions selected by a module and to initiate the reproduction of the selected version.

Other characteristics and advantages of the invention will become apparent through the description of a nonlimiting exemplary embodiment of the invention, explained with the help of the attached figures, among which:

To facilitate the description, the invention will be described hereinafter within the framework of the search for and of the user of a multimedia document (recording, reproduction, transmission to another user, etc.). By multimedia document should be understood any audio and/or visual document that can be downloaded with the help of an identifier. The document may be a photograph of which a part is downloadable through a request, and the entirety of which is transmitted in high-definition after payment.

According to the present exemplary embodiment, the receiver for the implementation of the invention may be a computer, but any receiver appropriate for receiving digital video data with the help of a connection to a bidirectional communication network, the Internet for example, is suitable.

Figure 1:
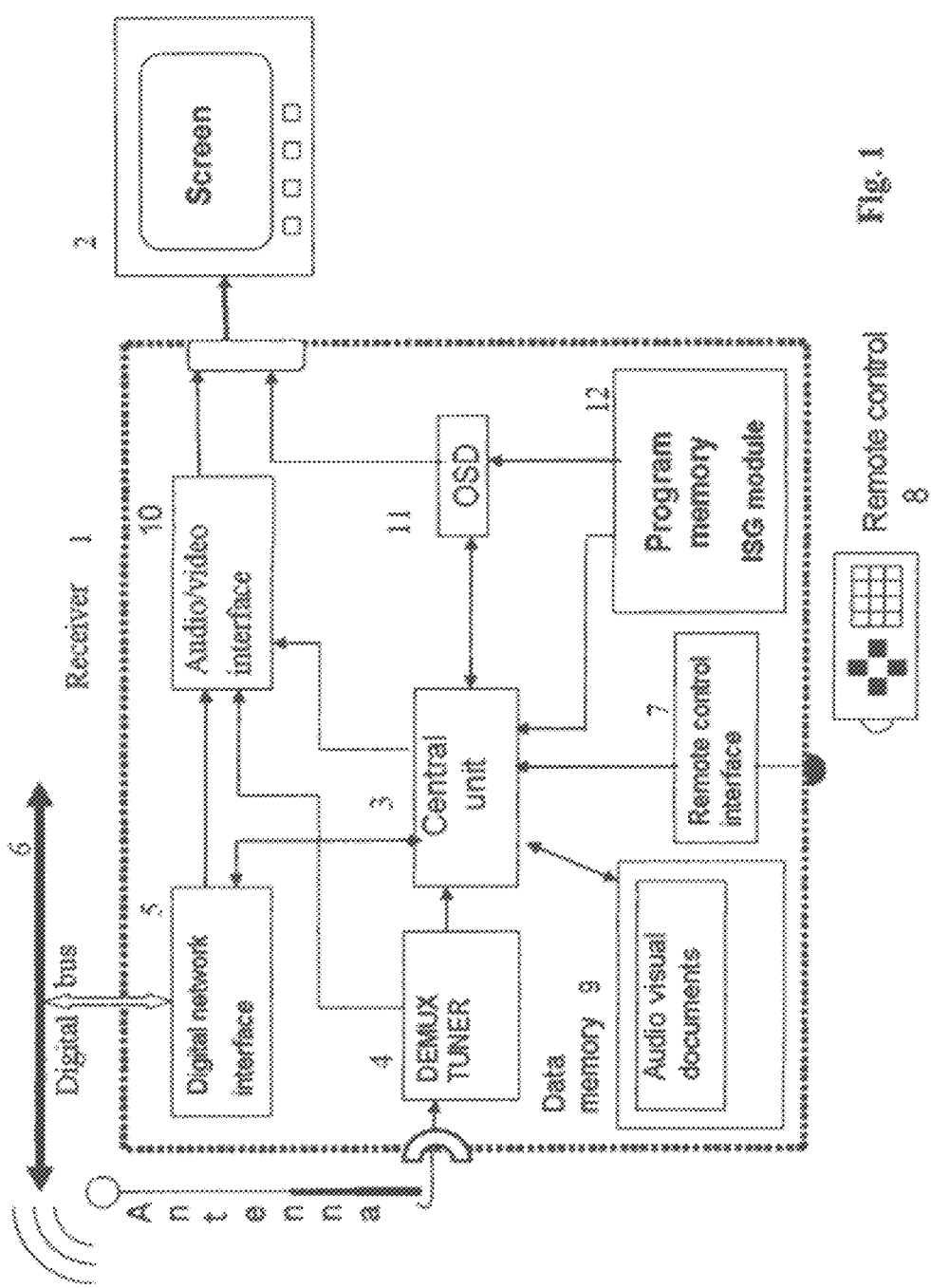
FIG. 1 is a block diagram of a system for receiving and recording audiovisual documents according to a present exemplary embodiment.

FIG. 1 is a block diagram of a receiver 1 capable of receiving and recording multimedia documents. If the receiver 1 is not already equipped with a display means, it dispatches display signals to a viewing screen 2. The receiver 1 possesses a central unit 3 linked to a bidirectional communication circuit 5 for the transmission of data through a high-speed digital bus 6. This bus makes it possible to transmit search requests to remote servers and to receive audiovisual data with a view to storage. This network is for example the Internet. The audio and/or video sections or packets are stored in predefined areas of a data memory 9. The memory 9 is typically a hard disk with a minimum capacity of 80 giga-bytes. If necessary, the information is firstly decrypted by a decrypter circuit as a function of the user's rights, before being stored in the memory 9. The receiver also comprises audio/video decoding logic 10 for the generation of the audiovisual signals dispatched to the television screen 2, and optionally a memory 12 contains the operating software for the receiver and specific applications. According to the present example, the memory 12 contains at least one user interface module called an "Intelligent Search Guide" or ISG for short. For the clarity of the diagram, the memory 12 is represented in the form of a single block, but comprises at one and the same time random-access memory, read-only memory and reprogrammable persistent memory (for example of 'Flash' type).

The receiver 1 also comprises an infrared interface 7 of a remote control 8, the said interface also being linked to the microprocessor 3. The remote control is furnished with ↑,↓,→ and ← navigation and "Record" keys and an "OK" confirmation key the respective functions of which we will later see. The use of navigation keys in no way limits the invention to keys of this type, the use of "Up" and "Down" direction keys or of a mouse, or any other pointing means for navigating around a displayed list is entirely conceivable.

A character generator 11, often called an OSD circuit (the abbreviation standing for On Screen Display), allows the generation of command menus or graphics relating to the parameters of the receiver or to a particular application. The video signal generated by this character generator is multiplexed with one of the video signals originating from the receiving means 4 or from the interface 5 with the digital network to a SCART socket linked to the viewing screen 2.

In an optional manner, the receiver 1 is linked to an antenna, itself linked to a receiving means 4 which comprises a tuner which provides a signal to a demodulator, the data received are corrected by a corrector circuit and transmitted to a demultiplexer. The demultiplexer comprises a certain number of filters programmed by a central unit 3 as a function of the diverse applications supported by the receiver 1. The filters correspond to an item of identification information present in the header of the packets of the demodulated signal.

After having detailed the main elements implementing the invention according to an exemplary embodiment, we shall now explain how they cooperate.

Figure 2:
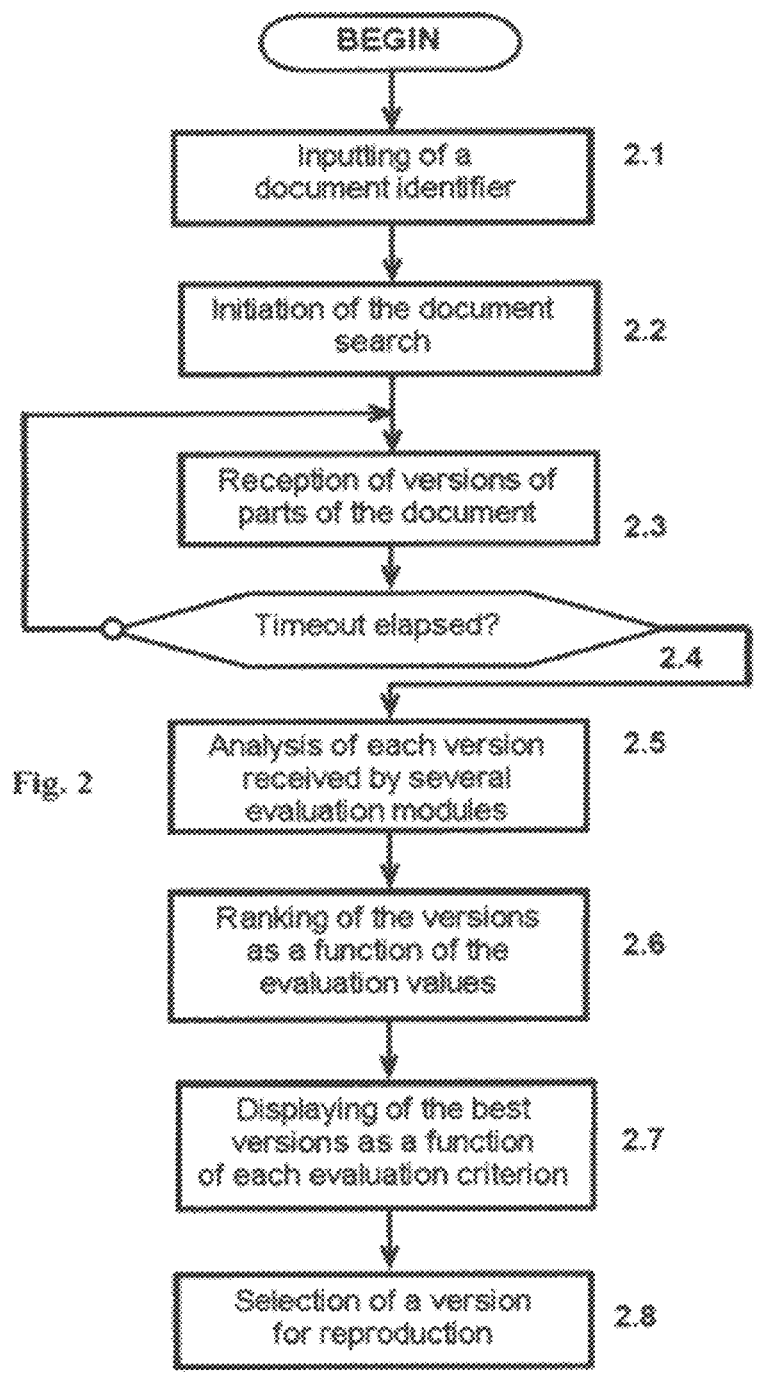
FIG. 2 represents a flowchart showing the chaining of the steps for initiating the search and evaluating the document versions received.

FIG. 2 shows the main steps of the execution of a search and the presentation of the results by the ISG module. Initially (step 2.1), the user inputs the name of a document identifier. This name may be the title of the document, but also a string of characters allowing definite identification of the document. For example, the user can input the name of "film Titanic", or "highly successful film by James Cameron name of a boat". The input can be performed on an alphabetic keyboard or with the help of a remote control by selecting the icons corresponding to the letters making up the name of the identifier. In step 2.2, the user initiates the search, the ISG module then transmits on the network a request asking for versions of the document identified by the name that was input. A version is a multimedia content whose content is similar to that of the document identified in the search request. These are generally better or worse copies of the identified document. Next the receiver configures itself into await response mode (step 2.3). According to a first embodiment, in step 2.4, the receiver waits for a determined duration for the results of the search before processing them. The user can parametrize the duration for which the receiver waits for the results through a configuration menu, the option to wait for the results makes it possible in particular to receive documents originating from a broadcasting network. The results may be the complete document, or a sizable part of the document, for example a three-minute extract.

The reception of a complete document is preferable for a complete analysis of the document, but it is not always possible, since certain versions of the document may have to be paid for, only an extract is available.

When the timeout has elapsed, the ISG module analyses the results with the help of various analysis modules (step 2.5). These analysis modules evaluate each version of the document according to a standard criterion. These modules are downloadable and may be updated in the ISG module, so that each receiver furnished with the ISG module can evaluate in the same manner the document versions received. Each module delivers a score from 0 to 20 for example, indicating the quality of a version of the document as a function of the criterion.

Each evaluation module is known per se, including for example:
  module for evaluating image definition (SD, HD, etc.),
  module for evaluating blurriness,
  module for evaluating blockiness,
  module for evaluating contrast,
  module for evaluating audio quality (presence of noise), etc.

According to one refinement, the score takes into account the time of the degradation according to the criterion associated with the module. Let us take for example the audio quality criterion, if the data transporting the audio of the version received are heavily degraded for five minutes in a document with a duration of an hour, then the degradation is only momentary, and the final evaluation score for the version received is positive overall. One way of proceeding consists in fragmenting the version received into time intervals of the same duration, for example a minute. In the course of each time interval, a fragmentary evaluation score is calculated.

The overall evaluation score for the version received is then the average of the fragmentary scores. The formula for calculating the overall evaluation score is:

$$Q = \frac{1}{N} \times \sum_{i=1}^{N} q_i$$

Where qi is the fragmentary evaluation score for fragment i,
  N is the total number of fragments,
  and Q is the overall evaluation score.

According to another refinement related to the previous refinement, the score takes into account the fact that the degradation occurs in the course of one or more time intervals and that these intervals are important for the understanding or the progress of the document. An important moment is for example in a sports event the 30 seconds which precede an abrupt increase in the noise. If the degradation occurs at such a moment, the score is reduced. The formula for calculating the overall evaluation score is then:

$$Q = \frac{1}{\sum_{i=1}^{N} a_i} \times \sum_{i=1}^{N} a_i \times q_i.$$

Where qi is the fragmentary evaluation score for fragment i, and
  ai is the importance value of time interval i of the document.

The importance value of the moment may be based on the use of a saliency map. The saliency map makes it possible to adapt the quality score as a function of the position of the defects on the image. For example a defect located on a face can have a more troublesome impact than on the background or on the backdrop. The quality score qi per fragment can take the spatial saliency into account directly.

According to one variant, the version received is already segmented and service information provides the importance value of each segment. In this case, the ISG module uses the values associated with each segment to calculate the overall evaluation score.

In step 2.6, the ISG module ranks the various document versions according to the score delivered by each module. According to a preferred embodiment, each evaluation module selects a document which has been evaluated with the best score. In step 2.7, the ISG module displays on the screen the identifiers of each of the documents selected by the modules while indicating the scores provided by the evaluation modules on the screen. The user can thus choose the document which suits him best as a function of each evaluation criterion. In step 2.8, the user selects a version of the document, and if it has been fully downloaded, its reproduction begins forthwith. If the document is not complete, a message is displayed signalling a waiting time and, optionally, the moment at which this version of the document will be available. If the document is selected with a view to recording alone, the ISG module warns the user of the moment at which it will be fully recorded.

According to one variant, upon each receipt of a new version, the ISG module evaluates all the versions received so as to rank them according to the evaluation criteria. The display is thus updated over time, the user must manually stop the search by inputting a command. This variant is particularly useful when access is available to broadcasting networks liable to broadcast a version of the document at an unknown moment.

Figure 3:
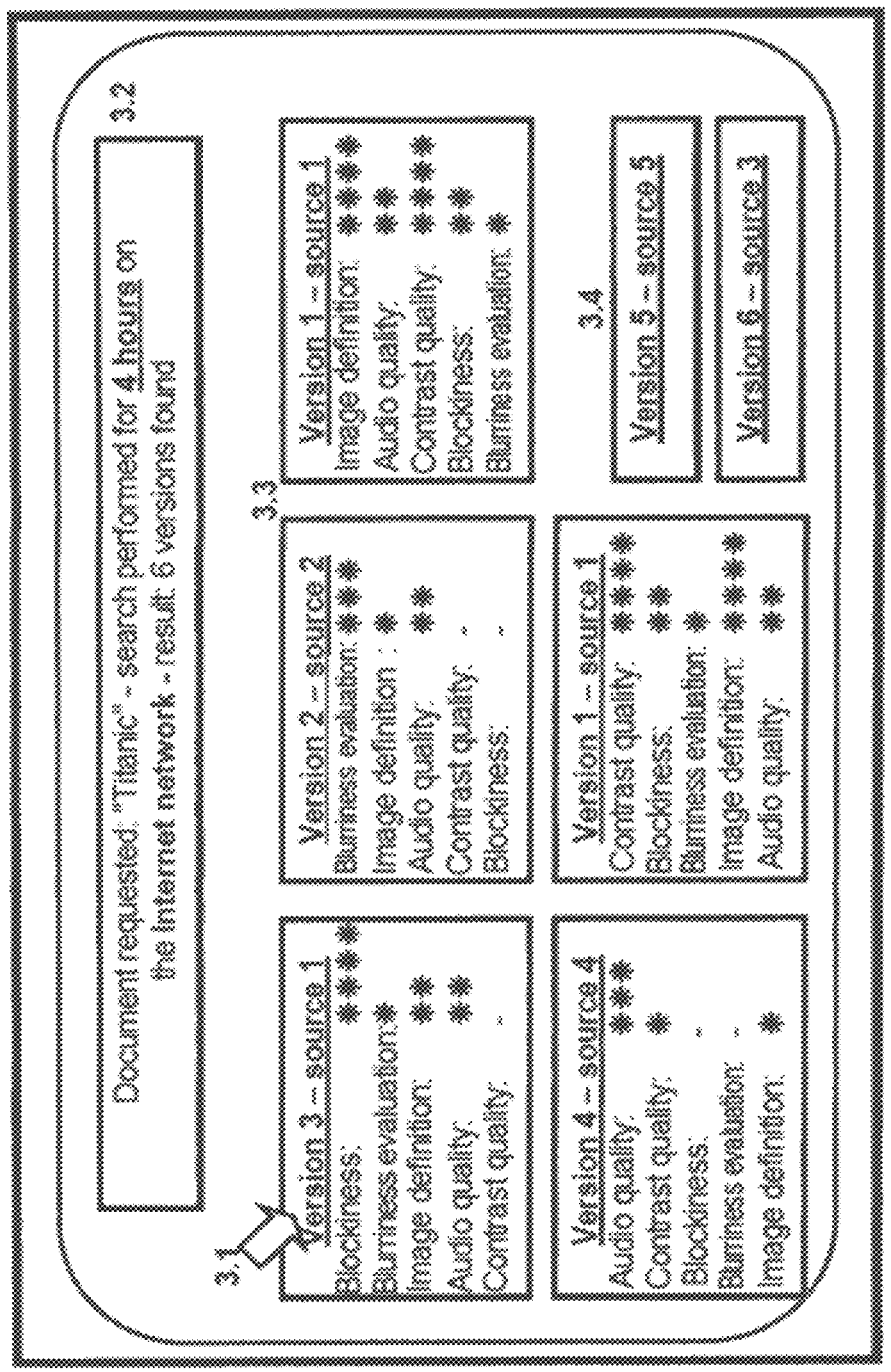
FIG. 3 is an exemplary representation of a screen shot showing the selection by the evaluation modules of the best versions according to the evaluation criteria of the said modules.

FIG. 3 shows a screen shot generated by the ISG software displaying evaluation scores for the various received versions of the document.

A cursor 3.1 makes it possible to select the various elements of the menu. The user moves the cursor 3.1 with the help of a pointing means such as direction keys or a mouse. The menu comprises a top banner 3.2 where the title of the requested document and the information about the conditions of execution of the search are displayed: typically the time and the network or networks on which it has been initiated, as well as the number of versions found. An area 3.3 presents the results of the search. Each version is presented while associating therewith the evaluation scores provided by the modules, in the order beginning with the highest scores. Each version is identified by a number and by its source, for example the site from which this version has been or may be downloaded. The version "Version 1-source 1" is that which has the best evaluation for the image definition criterion (SD, HD, etc.). The version "Version 2-source 2" is that which has the best evaluation for the blurriness criterion. The version "Version 3-source 1" is that which has the best evaluation for the blockiness criterion, that is to say it contains the fewest erroneous blocks of data. The version "Version 1-source 1" is also that which has the best evaluation for the contrast criterion, and the version "Version 4-source 4" is that which has the best evaluation for the audio band quality criterion.

The last two versions which do not have the best evaluations according to any of the five modules, are also accessible through two icons displayed in an area 3.4.

This presentation of the versions allows the user to immediately ascertain the version which is best according to each of the evaluation criteria. He can then rapidly choose the version which best corresponds to his preferences. The user then positions the cursor 3.1 on the version that he desires to see and presses the "Enter" key of the keyboard or of the remote control, the version of the document is then reproduced and appears in full screen. If the document is of audio type, the version selected is immediately reproduced on loudspeakers.

Figure 4:
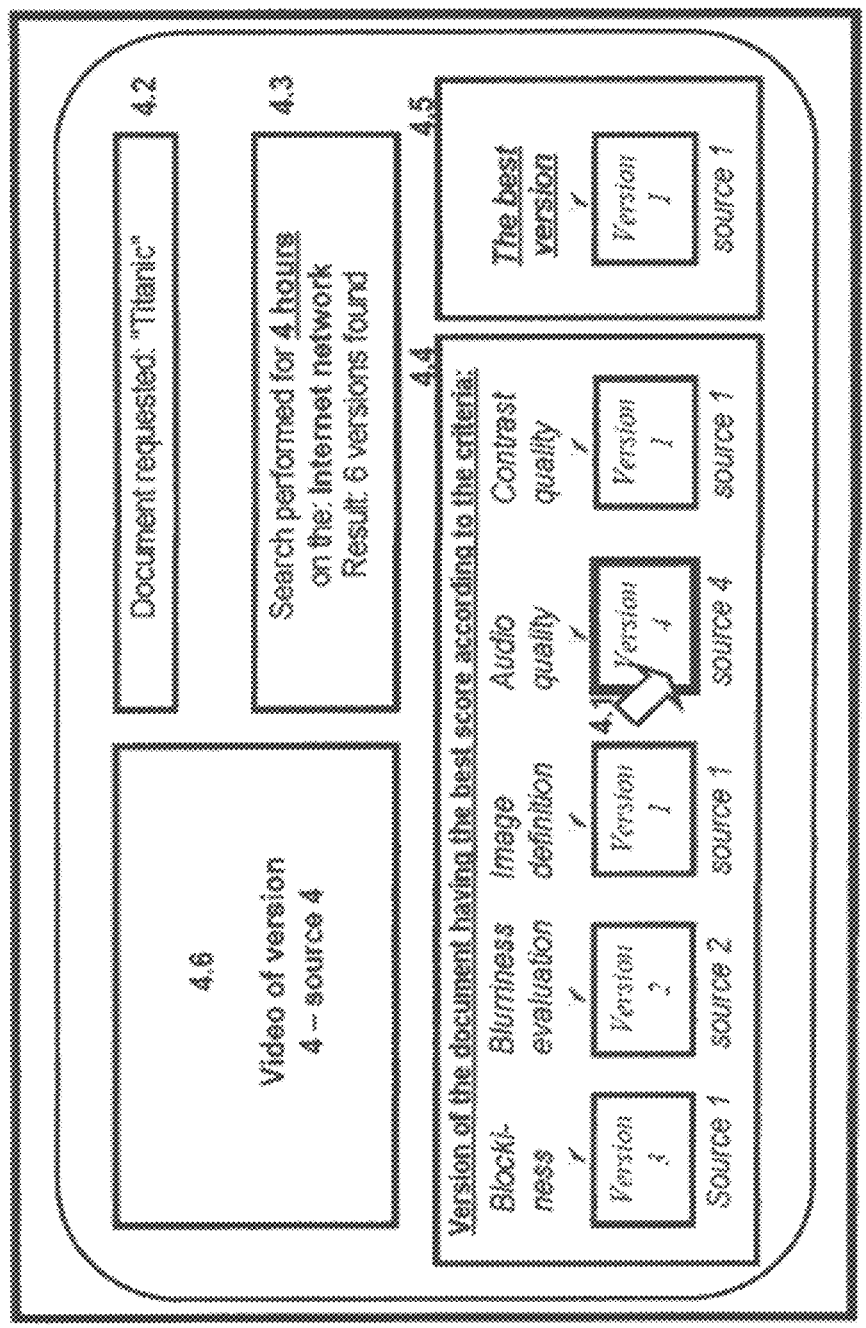
FIG. 4 is another exemplary representation of a screen shot showing the best versions retained by the evaluation modules.

FIG. 4 shows another screen shot generated by the ISG software displaying the document versions which have the best evaluation scores. The cursor 4.1 makes it possible to select the various elements of the menu. The menu comprises a top banner 4.2 where the title of the requested document is displayed and an area 4.3 advising of the conditions of execution of the search. It is seen that six versions have been received, but as there are only five evaluation modules, five versions at most are accessible through this menu. An area 4.4 presents the results of the search.

Each evaluation module is represented by an icon or a caption in the area 4.4. The list of the five evaluation modules is thus apparent: image definition, blurriness, blockiness, contrast, audio quality.

Associated with each module, FIG. 4 presents a frame containing an identifier of the version found by the search, and the source which allows or which allowed this version to be downloaded. An area 4.6 displays the video of the version which is situated under the cursor 4.1, and if the user presses the "Enter" key, then this version is reproduced and appears in full screen.

A refinement consists in also presenting the version received which possesses the best score when taking all the criteria into account.

The identifier of this document version appears on the right in an area 4.5. In the case of FIG. 4, it is the version "Version 1-source 1" which is the best in respect of the image definition and contrast quality criteria. According to a simple embodiment, the evaluation scores for each version received are added up, and the best version is that which possesses the highest sum. In this way, if the user does not have time to study all the results separately, he can by default select the version that the ISG module considers to be the best overall.

According to one refinement associated with the previous refinement, the user can parametrize each module by indicating his preferences.

The ISG module then assigns coefficients to each evaluation score whose value depends on the importance of this evaluation criterion to the user. While summing the evaluation scores, the ISG module multiplies each score with a coefficient; the more important for the user the criterion evaluated by the module, the higher the coefficient.

Let us take the example illustrated by FIG. 4, to determine "the best version received", the ISG module takes into account the scores assigned by the five evaluation modules for each version received.

The user has ordered the preferred list of criteria in the following manner:

$1^{st}$: blockiness
$2^{nd}$: evaluation of blurriness
$3^{rd}$: image definition
$4^{th}$: audio quality
$5^{th}$: contrast According to this refinement, the five evaluation criteria are presented in the area 4.4 in the order defined by the user. The main advantage of this refinement consists in the fact that the ISG module associates each score produced by each of these five modules with the following coefficients: 1.4, 1.3, 1.2, 1.1 and 1.

Therefore the overall evaluation of a version is the sum:

$$\text{Sum} = (1.4 \times \text{Blockiness evaluation score}) + \\ (1.3 \times \text{Blurriness evaluation score}) + (1.2 \times \text{Image definition score}) + \\ (1.1 \times \text{Audio quality score}) + \text{Score evaluating the contrast.}$$

The version whose sum is the largest is considered to be the best and its identifier appears in the area 4.5.

According to one refinement, the receiver has access through its receiving means 4 to at least one digital broadcasting network. The receiver then analyses the service information signalling the documents which will be broadcast at a determined time on a determined channel. At the specified moment, the terminal connects up to the channel and can thus download a new version of the document.

Persons versed in the art will be able to adapt the present invention under numerous other specific forms without straying from the as claimed field of application of the invention. In particular, the electronic receiver may be any apparatus having a means for receiving a document coming from a network and a storage memory in which the document may be downloaded. Consequently, the present embodiments should be considered by way of illustration but may be modified in the field defined by the scope of the attached claims.

The invention claimed is:

1. A method of selecting a version from among a plurality of versions of a document, said method comprising at a receiver connected to at least one communication network;
receiving, from the at least one communication network, a plurality of versions of a document identified by an identifier within the receiver upon initiation of a search, each of said plurality of versions including at least a partial document;
dividing each version received into a plurality of time intervals of equal duration;
analyzing at least a part of the content of each version received, from the at least one communication network, by a plurality of distinct evaluation modules of the receiver, each module calculating an evaluation value for each time interval of each version received according to at least one of an image and audio quality criterion,
obtaining an evaluation score of each version received from an average of evaluation values calculated for each time interval of the version, each evaluation value being weighted for the calculation of the evaluation score based on an importance of the associated time interval within the document, an importance of the time interval being determined based on the use of a saliency map;

selecting, for each of the evaluation modules, the identifiers of the versions having a highest evaluation score;

displaying the selected identifiers.

2. The method according to claim 1, further comprising waiting for the results of the search during a timeout period; and analyzing at least a part of the content of each version received beginning only at the end of the timeout, wherein no version received subsequently is analyzed.

3. The method according to claim 1, further comprising;
calculating the sum of evaluation scores computed by each module, and
selecting a single version, said selected single version being the one whose sum of evaluation scores is the biggest.

4. The method according to claim 3, wherein during the calculation of the sum of the evaluation scores, certain evaluation scores are multiplied with values defined by a user so as to assign one of more and less importance to certain image and/or quality criteria.

5. An Apparatus for viewing a plurality of versions of a document comprising
a means for receiving an input of an identifier of a document,
a means for sending a search request to at least one communication network to receive the plurality of versions of the identified document;
a receiver for receiving, from the communication network, a plurality of versions of said identified document, each of said plurality of versions including at least a partial document and dividing each version received into a plurality of time intervals of the equal duration,
a plurality of distinct evaluation modules that calculate an evaluation value for each time interval of each version received according to at least one of an image and quality criterion, from the communication network, based on at least a part of the content of said version received, an evaluation score of each version received being obtained from an average of evaluation values calculated for each time interval of the version, each evaluation value being weighted for the calculation of the evaluation score based on an importance of the associated time interval within the document, an importance of the time interval being determined based on the use of a saliency map,
a viewing screen for displaying the identifiers of versions having a highest evaluation score according to at least one of each image and quality criterion.

6. The apparatus according to claim 5 further comprising a timer defining a duration in the course of which the apparatus waits for the results of the search, the plurality of distinct evaluation modules being activated only at the end of the duration, wherein no version received subsequently is analyzed.

7. The apparatus according to claim 5, wherein the plurality of distinct evaluation modules calculate the sum of the evaluation scores computed by each module, the viewing screen displaying the identifier of the version whose sum of evaluation scores is the biggest.

8. The apparatus according to claim 7, wherein during the calculation of the sum of the evaluation scores, certain evaluation scores are multiplied with values defined by a user so as to assign one of more and less importance to certain criteria.

9. An apparatus for viewing a plurality of versions of a document comprising
an input interface that receives an identifier of a document,
a communication circuit that
sends a search request to at least one communication network to receive the plurality of versions of the identified document, and
receives, from the at least one communication network, a plurality of at least partial versions of said identified document, said document of each version received further being split into a plurality of time intervals of the same duration,
a plurality of distinct evaluation modules that calculate an evaluation value for each time interval of the version received according to at least one of a determined image and quality criterion, from the communication network, based on at least a part of the content of said version received, an evaluation score of each version received being obtained from an average of evaluation values calculated for each time interval of the version, each evaluation value being weighted for the calculation of the evaluation score based on an importance of the associated time interval within the document, an importance of the time interval being determined based on the use of a saliency map,
a viewing screen for displaying the identifiers of versions having a highest evaluation score according to at least one of each image and quality criterion.

10. The apparatus according to claim 9, further comprising a timer defining a duration in the course of which the apparatus waits for the results of the search, the plurality of distinct evaluation modules being activated only at the end of the duration, no version received subsequently being analyzed.

11. The apparatus according to claim 9, wherein the plurality of distinct evaluation modules calculate the sum of the distinct evaluation scores computed by each module, the viewing screen displaying the identifier of the version whose sum of evaluation scores is the biggest.

12. The apparatus according to claim 11, wherein during the calculation of the sum of the evaluation scores, certain evaluation scores are multiplied with values defined by a user so as to assign one of more and less importance to certain criteria.

* * * * *